Nov. 17, 1931.  M. C. HORINE  1,831,862
CRANK AXLE CONSTRUCTION FOR SIX-WHEEL BUSSES
Filed Oct. 23, 1929  2 Sheets-Sheet 2
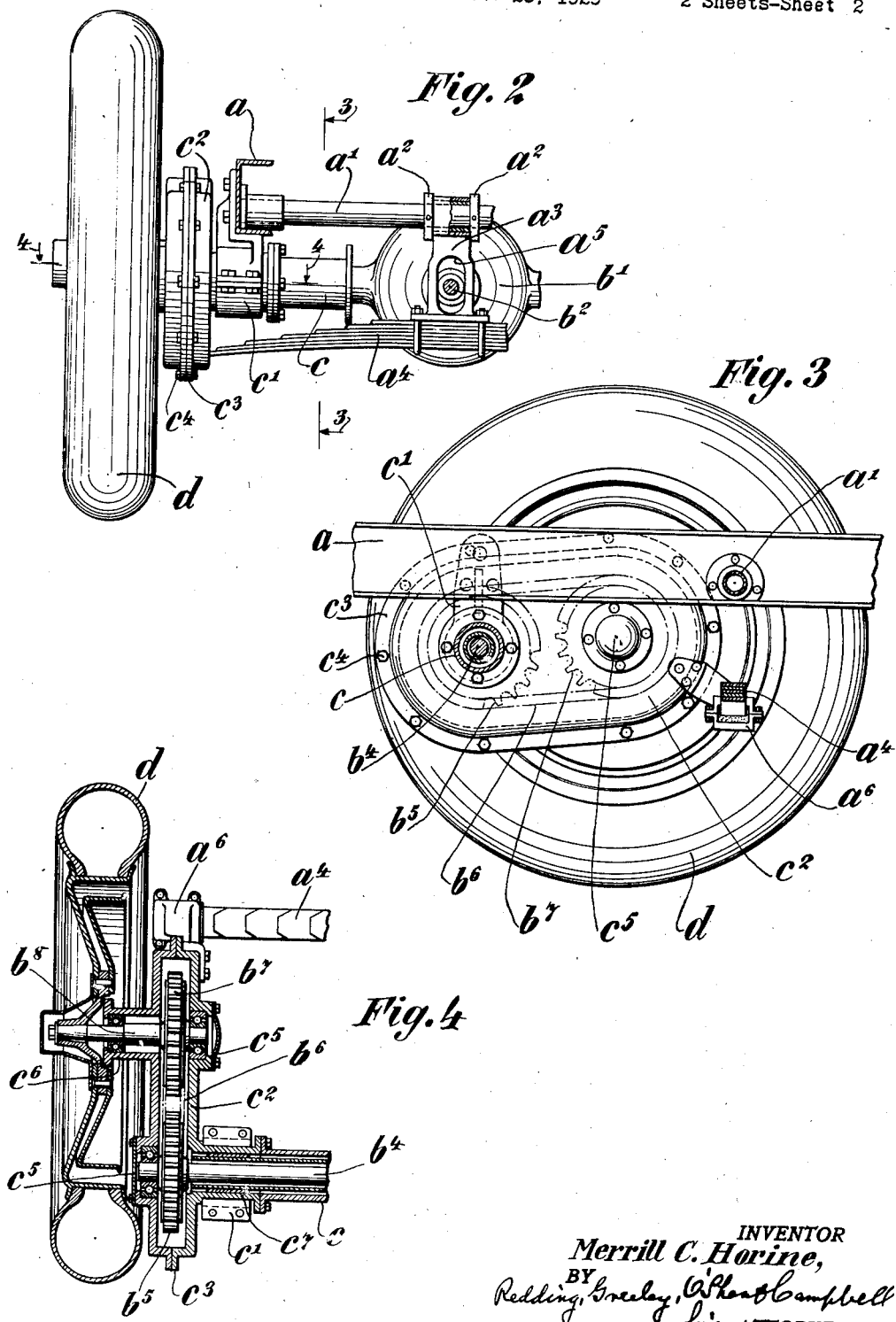
INVENTOR
Merrill C. Horine,
BY Redding, Greeley, O'Shea & Campbell
his ATTORNEYS.

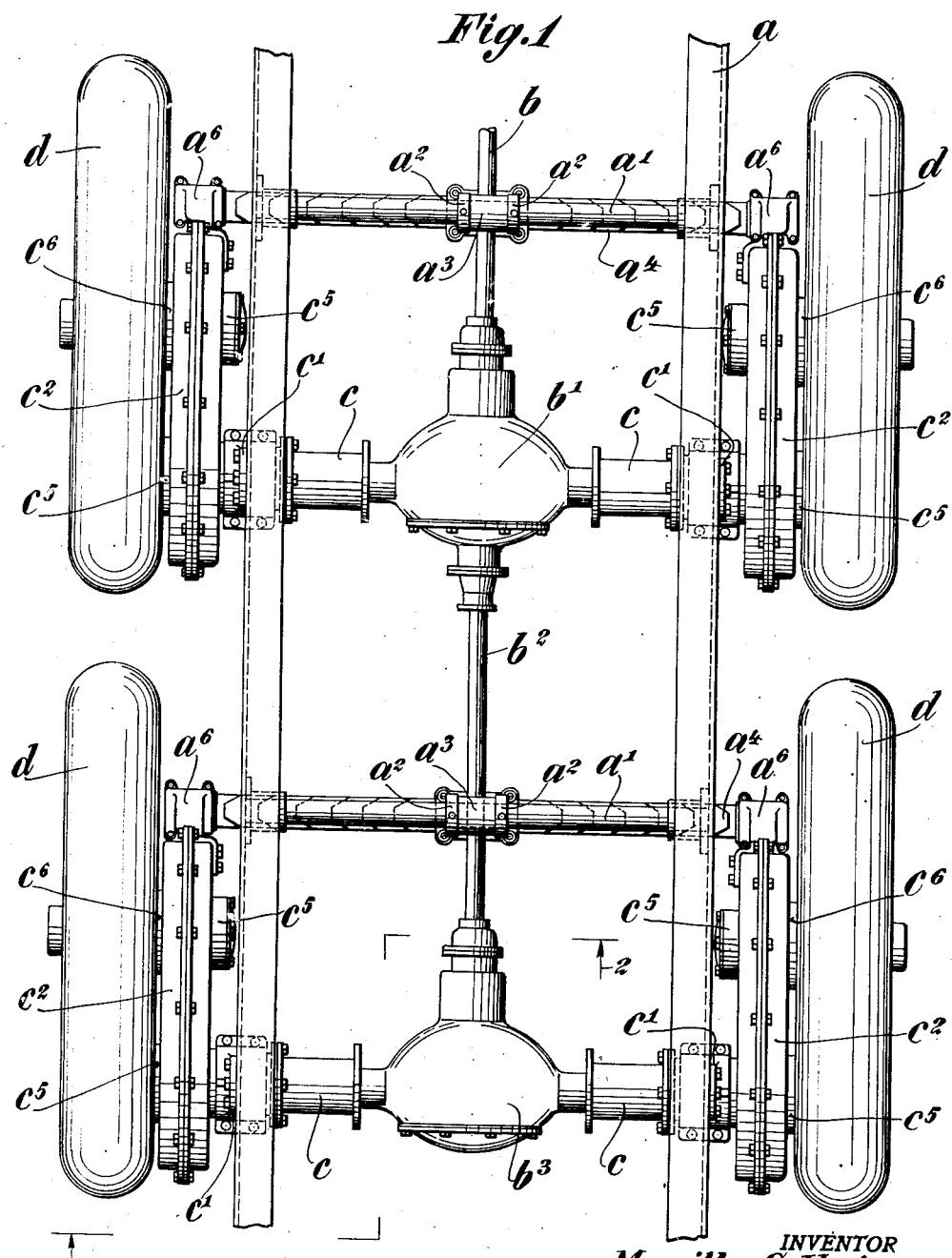

Patented Nov. 17, 1931

1,831,862

UNITED STATES PATENT OFFICE

MERRILL C. HORINE, OF NEW YORK, N. Y., ASSIGNOR TO INTERNATIONAL MOTOR COMPANY, OF NEW YORK, N. Y., A CORPORATION OF DELAWARE

CRANK AXLE CONSTRUCTION FOR SIX-WHEEL BUSSES

Application filed October 23, 1929. Serial No. 401,730.

The present invention relates to chassis for motor vehicles and embodies, more specifically, an improved chassis in which the frame is lowered materially and yet affords a satisfactory road clearance and the drive thereof includes individual driving means for each of the driving wheels.

It is particularly contemplated to afford a vehicle construction which is characterized by extraordinary ease of riding, together with a light and simple construction, the unsprung portions of such vehicle being reduced to a minimum and the driving elements, including the various gears and differential mechanisms, being highly efficient. In the construction described herein, two jack shafts are mounted upon the frame and secured firmly to the lower side thereof, the jack shaft mounting telescoping, at their outer ends, within hollow quills which are formed within suitable cranks, or wheel mounting mechanisms, described in greater detail hereinafter. The spring suspension for these cranks includes transverse inverted flat springs, the outer ends of which are preferably mounted within blocks of yielding non-metallic material carried upon the cranks and the central portions of which are journaled upon tubular cross frame members.

An object of the foregoing invention is, accordingly, to provide a vehicle construction which affords the desired road clearance and the center of gravity of which is materially lowered.

A further object of the invention is to provide a construction of the above character in which the drive is of such form as to eliminate the shocks ordinarily felt due to irregularities in the road surface and the consequent reaction of the driving mechanism thereto.

A further object of the invention is to provide an improved drive for a plurality of wheels which are mounted upon the frame by independent mechanisms.

Further objects, not specifically enumerated above, will be apparent as the invention is described in greater detail in connection with the accompanying drawings, wherein:

Figure 1 is a plan view showing a portion of a vehicle chassis provided with a plurality of driving wheels mounted in accordance with the present invention.

Figure 2 is a view in section, taken on the line 2—2 of Figure 1, and looking in the direction of the arrows.

Figure 3 is a view in section, taken on the line 3—3 of Figure 2, and looking in the direction of the arrows.

Figure 4 is a view in section, taken on the line 4—4 of Figure 2, and looking in the direction of the arrows.

Referring to the above drawings, $a$ designates a vehicle frame carrying cross tubes $a'$. These tubes are spaced apart equivalent to the spacing of the forward and rear driving wheels upon the frame and are provided with shoulders $a^2$, between which a bracket $a^3$ is journaled. Each bracket carries a transverse inverted flat spring $a^4$, the ends of which mount the mechanisms for carrying the wheels as described in greater detail hereinafter.

The primary drive is shown at $b$ and constitutes a propeller shaft for supplying power to a forward differential $b'$ which apportions power between the jack shafts of the forward wheels and the rear shaft section $b^2$. The shaft section $b^2$ drives a rear differential $b^3$ which apportions power between the jack shaft sections for driving the rear driving wheels.

The jack shafts from the forward and rear differentials are telescoped within quills $c$ which are journaled upon the frame in brackets $c'$. These quills form inner extensions on crank housings $c^2$ which may be formed in two parts, joined by suitable flanges $c^3$ and bolts $c^4$ at the central section of the housing. Jack shafts $b4$ extend within the crank housings $c^2$ and drive suitable sprockets $b^5$ which engage chains $b^6$, also within the crank housings $c^2$. These chains engage driven sprockets $b^7$ which are mounted upon stub shafts $b^8$ within the crank housings $c^2$. The wheels $d$ are mounted upon the stub shafts $b^8$. The mounting of the quill $c$ within the bracket $c'$, and the extension of the quill which telescopes the jack shaft affords greater steadiness against side motion of the crank housing, at the same time permitting the quill to oscillate freely.

From Figure 4 it will be apparent that the crank housings are made of two similar half sections bolted together at their flanges in the central section of the housing. Bearing boxes $c^5$ are provided in the housing sections for mounting the corresponding ends of the jack shafts $b^4$ and the stub shafts $b^8$, respectively. The dead hub of the wheel $c^6$ is formed exactly like the quill $c^7$ to which the quill extension $c$ is secured, thus enabling the housing to be completely standardized and the elements thereof easily manufactured and assembled.

With reference to the spring suspension, the brackets $a^3$ are formed with elongated slots $a^5$ which receive the propeller shaft $b$ and shaft section $b^2$, and permit relative movement between such brackets and the shaft sections. Housings $a^6$ are secured to the flanges $c^3$ of the crank shaft housings and are preferably provided with yielding nonmetallic material for receiving the ends of the springs $a^4$. By extending the crank housings in a forward direction from the jack shafts which drive them, instead of pushing on the frame, the wheels exert a pulling effect thereon, thus affording a smoother drive. In surmounting obstacles in the road this position of the crank housing will cause the wheels to move slightly backward in their crank arm path as they move upwardly or downwardly, thus affording additional cushioning effect. By reason of the fact that the springs $a^4$ are securely mounted upon the brackets $a^3$ without provision for pivotal movement of the springs in a transverse plane, each wheel has the benefit of an independent quarter-elliptic spring. Permitting the bracket $a^3$ to oscillate freely about the tubular cross members $a'$ compensates for the forward and back displacement of the spring owing to the crank arm action of the crank housings $c^2$. It will be observed that the mounting of the springs as described above gives it added leverage against the path of the wheel oscillation, owing to the fact that the wheel is constrained to travel in a radius about the center of the jack shaft. This will be clearly seen since the distance from the housings $a^6$ to the center of the jack shaft is much greater than the distance between the centers of the jack shafts and the corresponding stub shafts upon which the wheels are mounted. In this manner, the spring will have a very large deflection even though the vertical movement of the wheel spindle is not excessive, providing easier riding, by reason of the fact that the period of the spring becomes slower as its deflection increases.

While the invention has been described with specific reference to the structure shown in the accompanying drawings, it is obvious that the elements thereof may be designed in a different manner and the arrangement thereof changed to suit individual requirements, and the invention is not to be limited, save as defined in the appended claims.

I claim as my invention:

1. A drive for a motor vehicle comprising a driving wheel, a crank housing journaled upon the frame, a transverse spring, means to mount the spring upon the frame with capacity for movemnt in a longitudinal plane, means to mount the spring upon the end of the housing distant from the journal, and means to mount the wheel upon the housing between the spring mounting and the journal.

2. A drive for a motor vehicle comprising a plurality of driving wheels, crank housings journaled upon the frame at the sides thereof, a transverse spring, means to journal the spring upon the frame with capacity for movement with respect thereto in a longitudinal plane, means to mount the ends of the spring upon the ends of the housings distant from the journals, and means to mount the wheels upon the housings between the spring mountings and the journals.

This specification signed this 9th day of October, A. D. 1929.

MERRILL C. HORINE.